United States Patent [19]

Lynch

[11] Patent Number: 4,553,178

[45] Date of Patent: Nov. 12, 1985

[54] MAGNETIC RECORDING SYSTEM WITH PEAK SHIFT COMPENSATION

[75] Inventor: Donald F. Lynch, Littleton, Colo.

[73] Assignee: Electronic Processors, Inc., Englewood, Colo.

[21] Appl. No.: 458,965

[22] Filed: Jan. 18, 1983

[51] Int. Cl.[4] .............................................. G11B 5/09
[52] U.S. Cl. ........................................ 360/45; 360/46
[58] Field of Search ............................ 360/45, 46, 68

[56] References Cited

U.S. PATENT DOCUMENTS 3,665,485   5/1972   Pear, Jr. ................................. 360/45
4,334,250   6/1982   Theus .................................... 360/45

Primary Examiner—Vincent P. Canney
Attorney, Agent, or Firm—Donald W. Margolis

[57] ABSTRACT

A method and system provide for the compensation of peak shift of digital data recorded on D.C. premagnetized (erased) magnetic media. D.C. erasure results in the entire magnetic medium being aligned (polarized) in a single direction. The subsequent magnetic recording of data on such premagnetized medium normally results in a peak shift whenever the subsequently recorded signal traverses in the same direction of polarization as the single polarized direction of the D.C. erased medium. Such peak shift is compensated for in the present invention by utilization of a compensation circuit which, upon the receipt of an encoding signal which would cause data to be recorded which would traverse (be polarized) in the same direction as the premagnetized medium, is activated to provide a modified encoding signal to vary the placement of the magnetic boundaries of the recorded signal to compensate for its anticipated peak shift. The compensating circuit of the present invention is intermediate the source of the data encoding signal and the magnetic write head transducer. The compensating circuit of the present invention may either delay the return transition of the magnetically recorded signal, or cause the switching transition to be written earlier.

4 Claims, 5 Drawing Figures

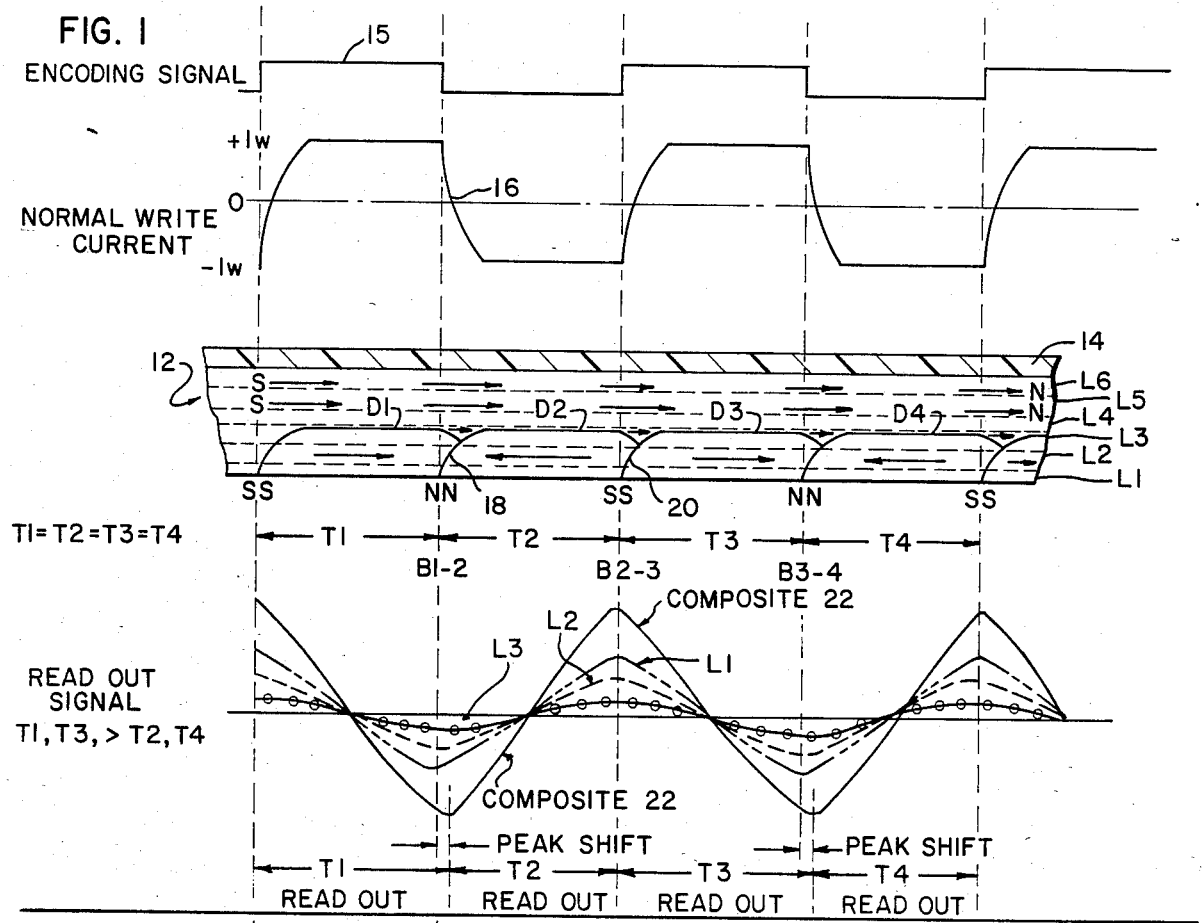

MAGNETIC RECORDING SYSTEM WITH PEAK SHIFT COMPENSATION

BACKGROUND OF THE INVENTION

1. Field of the Invention

The present invention relates to a data recording and decoding system, and more particularly to a method and system for improving the reliability of digital recording by correcting peak shift data errors caused by the use of D.C. premagnetized (erased) magnetic medium. The present invention is particularly useful in connection with the writing of digital data on D.C. premagnetized (erased) magnetic medium, and with the accurate reproduction and decoding of such recorded data by magnetic read/write systems. More particularly it relates to a system for modifying the timing of a write current in order to avoid or eliminate peak shift due to magnetic recording on D.C. premagnetized magnetic medium. It relates mainly to high density recording systems, but improved performance will also be experienced in lower density recording systems.

2. Description of The Prior Art

Modern data processing systems include a variety of means for recording or writing digital data on a variety of recording medium. The present invention is described in the context generally of magnetic medium such as flexible magnetic tape; however, the present invention is applicable to any form of recording of digital data having predictable characteristics on any magnetic recording medium. The words "recording" and "writing" are used interchangeably herein to designate the recording of magnetic data signals on any form of magnetic recording storage medium.

It is desirable in such systems to maximize the reliability of data writing and reproduction, while at the same time maximizing the data throughput, all with a minimum of data errors. Such maximization is achieved in present day magnetic recording systems by increasing both the storage (writing) and reproduction (reading) speeds, and by increasing the data density (bits per unit area) on the magnetic medium. As the data recording density is increased, various undesirable effects are known to occur which cause data errors as a result of the interaction of the magnetic domains which comprise the adjacent data bits on the magnetic medium. Such interaction effects the density at which data can be reliably written and read. Various data encoding techniques have been developed for reducing these effects, including run length limited coding, group code recording, and others; however, in any encoding scheme, the above mentioned undesirable interaction effects occur at some given data density. One such undesirable effect is called "peak shift," and it most often occurs as a result of pulse crowding of the data bits on the magnetic recording medium. Peak shift is characterized by a shifting of the data transition locations from their proper (expected or timed) location. Peak shift will often result in a data error. This is due to the fact that in such recording systems individual data bits are recorded during a specific bit cell time in such a manner that a change of magnetic flux, or a magnetic flux peak at the discrete locations within the data bit cell or at its boundaries is read as being indicative of the recorded data. Such recorded data is written and then read on the magnetic medium as, for example, a logical "1" or a logical "0". Such flux transitions may be either a reversal of polarity or a change from one level of magnetization or flux to another. As used herein, a "flux reversal" is defined as that point which exhibits the maximum free space surface flux density normal to the surface of the magnetic medium, and is used interchangeably with the term "transition". In NRZ encoding, for example, such a transition occurs whenever a logical "1" is to be recorded. In MFM encoding, whenever a transition occurs at a boundary it is read as a logical "0," while a transition at the center of a data bit cell represents a logical "1". Also, as used herein, a "data bit cell" is defined as that time period during which one data representative flux transition should properly occur.

Most prior art peak shift problems have been due to and inherent in the coding scheme and the resulting transition between two or more sequentially occurring bit cells. For example, in high density recording, and in particular when no data transition (polarization reversal) is present for two or more sequential bit cells, the point in time on the magnetic medium at which the next following transition peak occurs is found to shift from its proper (expected) place. This causes the width of the bit cell to vary, with the result that normal decoding circuits may decode (read) erroneous data due to loss of synchronization of incoming data, or due to the decoding of a transition (polarization reversal) occuring in an improper (adjacent) bit cell. When the pulses are close together the trailing edge of a previous pulse, or the leading edge of a succeeding pulse may extend past the bit cell of the pulse peak under consideration. When this happens the time of occurrance at the peak will be shifted toward either the preceding or succeeding pulse depending on which pulse's edge is overlapping the peak. Descriptions and drawings of this peak shift phenomenon are set forth in U.S. Pat. No. 3,623,041 (MacDougall) and 3,537,084 (Behr).

Additionally, since the art has advanced to higher recording densities it has become a common practice to not magnetically saturate the magnetic medium as deeply as was the common practice in lower density recording systems. However, this lack of saturation of the medium has presented an undesirable effect during the writing of new data over old magnetically recorded data. This is due to the fact that recording at lower frequencies, but at relatively high magnetic saturations may penetrate the medium more deeply than subsequent overwriting at higher frequencies, but with less magnetic saturation. In order to avoid difficulties due to unerased data which might remain after such overwriting, it is now common practice to magnetically erase the magnetic recording medium before recording (overwriting) on it. In the prior art, both A.C. and D.C. magnetic erase techniques have been used for erasure. The A.C. method of erasure is commonly used, but is relatively more costly in terms of the erase head and the circuit for the erase head which are required. However, despite its higher cost, A.C. erasure has the advantage of not producing premagnetized magnetic media which may introduce additional errors into the subsequently recorded data. By comparison, D.C. premagnetization (erasure) of magnetic medium requires a less expensive erase head and circuit, but has a tendency to introduce yet another kind of peak shift error into the data recorded and then read from such D.C. premagnetized medium. These errors in D.C. premagnetized (erased) magnetic medium are seen as a peak shift which occurs when signals are subsequently recorded on the medium, which recorded signals traverse (are polarized) in the same direction as the polarization of the D.C. premagnetized magnetic media.

Various approaches have been taken in the prior art in an effort to avoid or compensate for peak shift in magnetic recording; however, such prior art approaches have been primarily directed to the correction of errors caused by sequencing, rather than to errors inherent in the character of the polarization of the magnetic recording medium, at the time it is written, for example due to D.C. erasure.

One class of solutions to peak shift problems caused by sequencing has entailed compensating the signal at the time the data is written or encoded, e.g. when it is known that a particular peak will be shifted in a particular direction, by writing or encoding the data earlier or later in an effort to compensate for the shift which is expected to occur. This solution was at first treated as unsatisfactory since the pulse adjacent the pulse being compensated will also cause peak shift in the opposite direction. Thus, for a time it was taught by the prior art that using techniques of writing earlier or later were of little value as a means to avoid peak shift, and that in fact such techniques would cause other problems. More recently, techniques for timing adjustment have been found which do not cause opposite peak shift, but they have been quite complex. In any event, no prior art technique is known for adjusting data encoding to compensate for peak shift error due to the use of D.C. premagnetized medium.

U.S. Pat. No. 3,503,059 (Ambrico) discloses the most commonly used method of correcting pulse shift errors due to sequencing. Ambrico teaches the use of minor distortions (step write compensation) in the magnetic flux after each major transition so that upon read-back the peaks will occur at the proper time. U.S. Pat. No. 3,573,770 (Norris) employs the same technique, but different means to avoid peak shifting. U.S. Pat. No. 3,623,041 (MacDougall) uses a different approach which is quite successful as well. MacDougall provides a new system of encoding which has fewer signal transitions. Fewer transitions means fewer pulses, and therefore, less pulse crowding for similar data rates or intensities. U.S. Pat. No. 3,537,084 (Behr) employs a technique in which writing is not modified, but in which the read back is compensated.

Another prior art technique is described by U.S. Pat. No. 3,879,342 (Patel) in which a means of compensation for peak shift present in three frequency coding is introduced. A pulse shift circuit advances or delays the writing pulses; however, it is a complicated system in which three separate clock signals are required. In U.S. Pat. No. 3,483,539 (Poumakis) high density self-clocking information storage along a magnetic track is taught in which it is necessary to determine whether each successive pulse occurs after a predetermined short interval following the preceding pulse, or after a predetermined long interval following the preceding pulse. Poumakis then distinguishes between long and short intervals and repositions each pulse which occurs less than a minimum short interval following a preceding pulse so that each pulse always occurs after such a minimum interval.

In U.S. Pat. No. 4,000,513 (Precourt) peak shift due to pulse crowding of data recorded on a magnetic medium is reduced by preemphasizing the recorded data time pattern in order to compensate for peak shift of the magnetic pattern recorded on the magnetic medium. Preemphasis of recorded peak shift errors is accomplished either by delaying or advancing the time when a particular peak shift data transition caused by the encoding data pattern will occur. This complex system causes the data to either be delayed or advanced before it is written, thereby compensating for peak shift error which would otherwise be present in the recorded data.

Again it is noted that no known peak shift compensation system has been devised which simply and inexpensively adjusts the timing of the encoding signal used with D.C. premagnetized medium.

SUMMARY OF THE INVENTION

It is therefore an object of the present invention to provide a method and system for the compensation of peak shift of digital data recorded on D.C. premagnetized (erased) magnetic media. Where magnetic medium is D.C. erased substantially all of the magnetic domains on the entire magnetic medium are aligned (polarized) in a single direction. The subsequent magnetic recording of data on such D.C. premagnetized medium normally results in a peak shift whenever the subsequently recorded magnetic data traverses (is polarized) in the same direction as the premagnetized direction of the D.C. erased medium. Such peak shift is compensated for in the present invention by utilization of a simple adjusting circuit which, upon the receipt of an encoding signal which will cause data to be recorded which will traverse (be polarized) in the same direction as the premagnetized medium, is activated to provide a modified encoding signal which will vary the placement of the magnetic boundaries of the recorded signal to compensate for its anticipated peak shift. The compensating circuit, of the present invention may either delay the return transition of the recording signal, or cause the switching transition to be written earlier.

Another and additional object of the present invention is to provide a very simple, yet significantly effective improvement over any similar systems and methods of the prior art.

BRIEF DESCRIPTION OF THE DRAWINGS

The foregoing and other objects and advantages of the present invention will become apparent upon full consideration of the following detailed descriptions of preferred embodiments and accompanying drawings in which:

FIG. 1 schematically illustrates prior art digital recording on a D.C. premagnetized magnetic medium with respect to the normal write encoding used to make the recording, and the resulting read-out signal which includes peak shift errors.

FIG. 2 is a schematic illustration of digital recording on a D.C. premagnetized magnetic medium similar to that of FIG. 1, but illustrating the use of write encoding modified in accordance with the present invention to provide a modified writing signal and a read-out signal which is free from peak shift error.

DETAILED DESCRIPTION OF THE INVENTION

Figure 3:
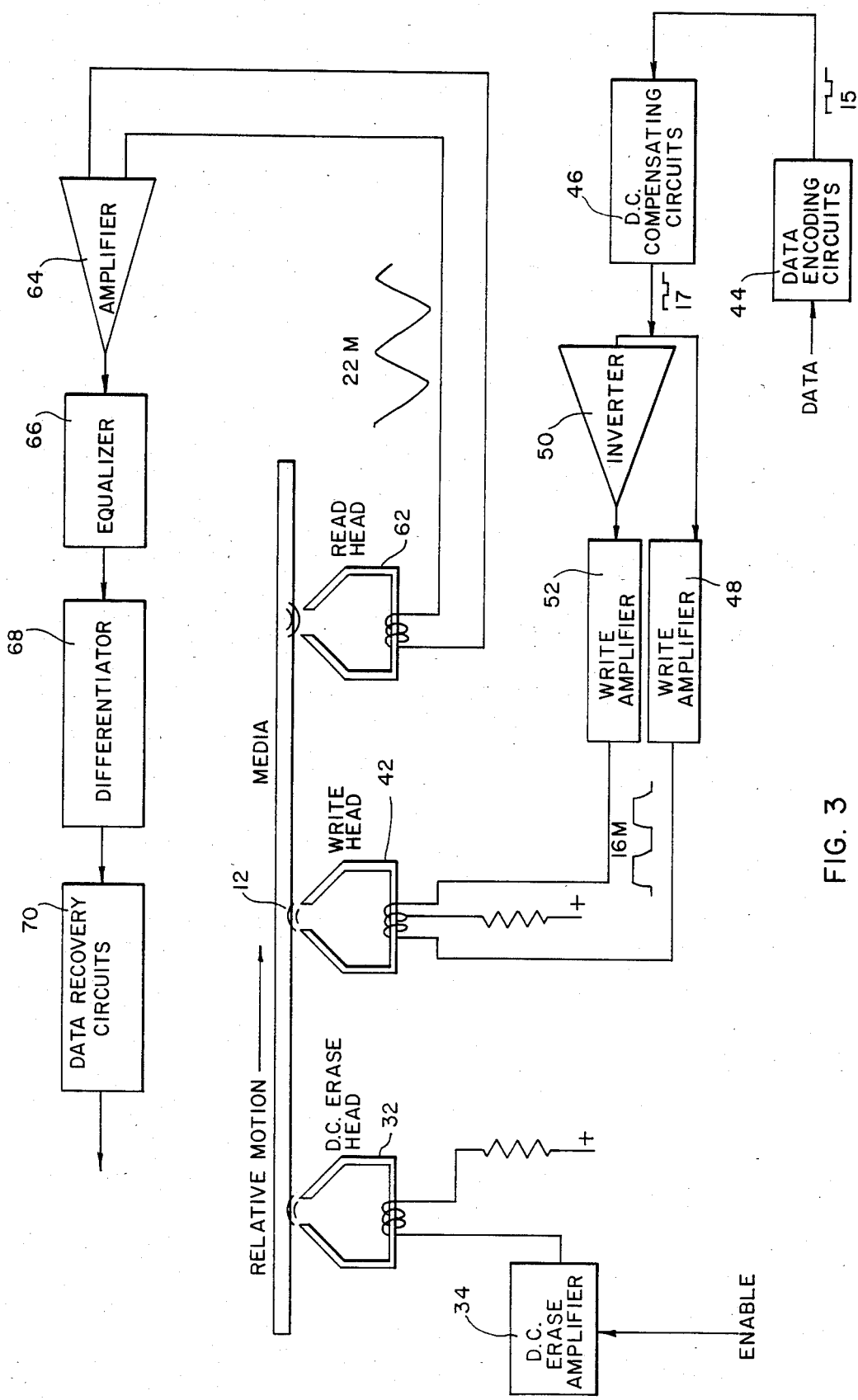
FIG. 3 is a combined schematic and block diagram of a combined erase/write/read system into which the system of the present invention is incorporated.

Referring first to FIG. 1, a prior art high density recording scheme on D.C. premagnetized magnetic recording medium 12, in this case in the form of magnetic tape, is schematically shown in cross-section. In order to illustrate and explain the problem of the prior art and the solution of the present invention the cross-section of magnetic medium 12 has been greatly enlarged and arbitrarily divided to illustrate six imaginary magnetic levels, L1 through L6, supported by non-magnetic substrate 14. In use level L1 is most closely adjacent any magnetic transducer, e.g. write, read or erase head, none of which are shown in FIG. 1, (but see FIG. 3). The length of media 12 is divided to illustrate a number of data bit or magnetic cells designated T1 through T4 and the transition boundaries B1-2, B2-3 and B3-4 therebetween.

Now referring to D.C. premagnetized media 12 at levels L4 through L6, it is seen that all of the magnetic domains are polarized in the same direction from south (S) to north (N) as represented by the arrows at levels L4 through L6. Indeed, the entire D.C. premagnetized media 12 was so polarized after D.C. erasure and prior to being written upon magnetically. However, as shown in FIG. 1 magnetic medium 12 has already been written upon by a magnetic write head transducer, not shown, operating under the driving force of writing current 16 in MFM (modified frequency modulation) form to write a series of "0"s so that D.C. premagnetized media 12 is modified with one magnetic polarity and then with the opposite polarity so that the polarity is reversed at each data bit cell boundary to represent the information ("0"s) recorded. However, as previously noted, in high density recording, magnetic medium 12 is not completely saturated, but is only magnetized to a given depth, say through L3, and even then the saturation or magnetization varies from L1 to L2 to L3, and so on, due to the effect of the existing D.C. premagnetization already present in magnetic media 12 and also due to other known magnetic phenomenon. The outermost portions of the magnetic medium which have been effected by writing flux magnetization are designated D1 through D4. It is thus seen that the magnetic polarity of domains D1 through D4 which are recorded in magnetic medium 12 vary at boundaries B1-2 and B3-4 from those which were intended to be written, and thus provide composite read-out signal 22 which is subject to peak shift for recorded signals at boundaries B1-2 and B3-4.

Referring again to FIG. 1, when encoding signal 15 causes write current 16 to be generated and applied to D.C. premagnetized magnetic medium 12 through a magnetic transducer to generate magnetic flux, magnetic polarity enhancement or reversal is caused to take place substantially within each bit cell boundary. At bit cell T1, which is subject to magnetic polarization in the same direction as the polarity of D.C. premagnetized magnetic medium 12, there is an additive magnetic effect, with the result that switching transition 18 in bit cell T2 is effected by a carry-over of magnetic polarization from L1 and L2 of bit cell T1. On read out boundary B1-2 between cells T1 and T2 is read as the composite sum of the polarity of the magnetic flux of levels, L1, L2 and L3, and to some extent L4-L6 (not shown as an element of the read-out signal), the result is that the composite magnetic flux 22 peaks to the right of transition boundary B1-2. This is out of timing sequence, and is thus a peak shift problem. In a similar manner a peak shift problem occurs at boundary B3-4. When write current 16 is in a direction which will cause polarization flux to be recorded opposite to the D.C. premagnetized polarity of magnetic medium 12, as in bit cell T2, the composite sum of the magnetic flux 22 tends to cancel, and thus does not result in a peak shift, for example at boundary B2-3.

Having now defined the problem, it is seen that peak shift due to D.C. premagnetization is predictable for a given recording system using D.C. premagnetized magnetic medium. Referring to FIG. 2, as a solution to the problem of peak shift due to D.C. premagnetized medium, the present invention modifies the timing of write current 16 to displace the resulting recorded magnetic flux (and boundaries) D1, D2, D3 and D4 in such a manner that it compensates for the anticipated peak shift, and so that the modified composite read-out flux peak 22M is correctly timed. Referring again to FIG. 2, in which like portions are given the same numbers and in which similar portions are given related numbers as in FIG. 1, an application of the present invention is shown in which, writing current 16M has been modified, in this case by delaying the signal or the portion of the signal which will cause the writing of magnetic data which will traverse (be polarized) in the same direction as the polarization of the D.C. premagnetized magnetic medium 12. This results in a composite read-out signal 22M in which the magnetic flux peaks at B1-2 and B3-4 now occur at the correct time relationship, and in which there is therefore no peak shift problem. It should be noted that although writing current 16M is modified by the present invention in response to a newly generated encoding signal 17, encoding signal 15 is the same as that of the prior art as shown in FIG. 1.

A magnetic recording system including the present invention is set forth schematically and diagrammatically at FIG. 3. As illustrated, magnetic medium 12 is shown to be subjected to D.C. premagnetization by D.C. erase head transducer 32 driven by D.C. amplifier 34 and its enabling function, as is well known in the art. This D.C. premagnetization is most practically carried out on-line, as illustrated. However, D.C. premagnetization of the magnetic medium may also be carried out remotely and separately from the system shown. Any form of D.C. magnet, whether permanent or electromagnetic may be used to perform this D.C. premagnetization function so long as it saturates (erases) magnetic medium 12 to a greater depth than it has been or will be written or read.

Write head transducer 42 is located adjacent medium 12 in a manner such that when it is enabled it magnetizes medium 12 in one direction or in another (usually opposite) direction in accordance with the timing and direction of the write current 16M which it receives from its enabling circuitry and controls. Typically, data originates at or is transmitted through data encoding circuit 44, then through compensating circuit 46 of the present invention, and thence in parallel through amplifier 48 and inverter 50- amplifier 52 to write head 42. The initial timing of the encoding signal 15 is controlled by encoding circuit 44 and may include art known timing adjustments and variations of the current to compensate for peak shift expected due to certain data patterns and due to close packing of magnetic bits, of the kind discussed above in the Prior Art section of this specification. Encoding signal 15 from encoding circuit 44 is then subjected to further modification by novel compensating circuit 46 of the present invention to produce write current 16M, as explained in greater detail hereinafter. As a matter of reference it is noted that encoding signal 15 in both FIGS. 1 and 2 has been represented as a simple square wave, while in practice it will normally be a more complex function.

To complete the explanation of the utility of the present invention, the read-out of magnetic medium 12, which has been D.C. premagnetized and then written upon by magnetic write head 42 under the control of write current 16M from compensating circuit 46 is now detailed. Read-out of medium 12 is accomplished by magnetic read head transducer 62 using standard circuitry and controls, including, for example amplifier 64, equalizer 66, differentiator 68 and data recovery circuit 70. In the practice of the present invention the signals 22M and data thus read from medium 12 have their pulse peaks in the proper timing sequence, and do not experience peak shift problems or require any special read-out circuitry or adjustments. Thus D.C. premagnetized magnetic medium 12 recorded in accordance with the method and using the system of the present invention can be read accurately and without peak shift errors of the type normally caused by D.C. premagnetization of medium 12 by, for example, D.C. erase head 32.

Figure 4:
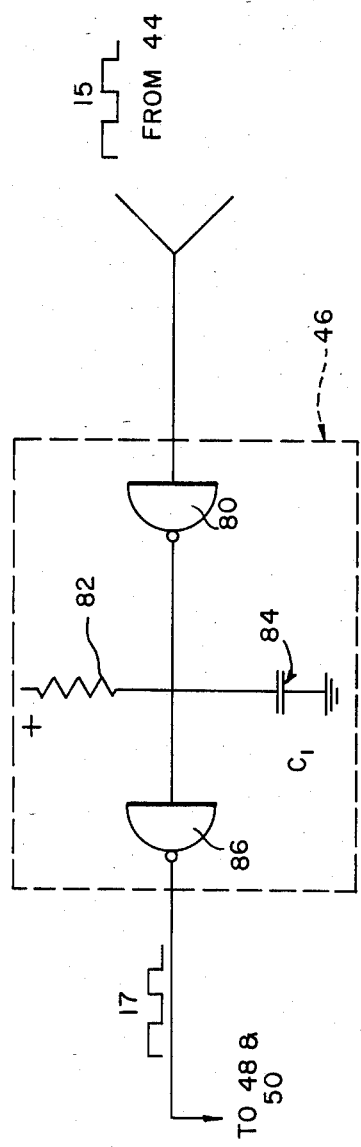
FIG. 4 is a detailed schematic and block diagram illustrating one preferred form of the compensating circuit of the present invention.
Figure 5:
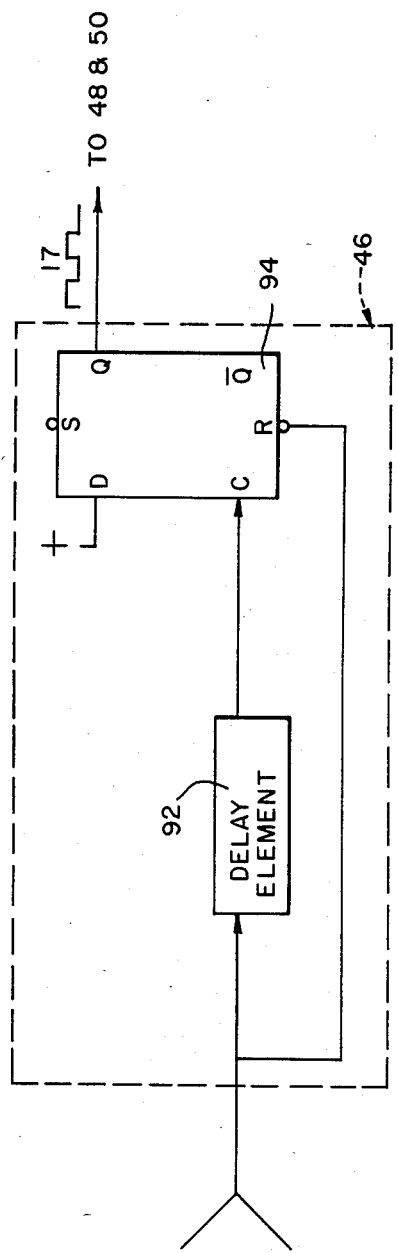
FIG. 5 is a detailed schematic and block diagram illustrating another preferred form of the compensating circuit of the present invention.

Forms and implementations of D.C. compensation circuit 46 are further detailed in FIGS. 4 and 5. The preferred embodiment of D.C. compensation circuit 46 is set forth in FIG. 4. It includes inverter 80, resistor 82, capacitor 84 and additional inverter 86. Resistor 82 and capacitor 84 are in series with inverter 80 which is in series with encoded output signal 15 from data encoding circuit 44. Resistor 82 and capacitor 84 are in parallel with one another. Inverter 80 is an open collector having low impedance which causes capacitor 84 to discharge rapidly. Inverter 80, by its nature also causes a 180 degree phase change in signal 15. Capacitor 84 is selected for activation, and thus delay of the signal, only when the direction of the resulting write current to head 42 will cause the production of a magnetic record bit which will traverse or be polarized in the same direction as the polarity of D.C. premagnetized magnetic medium 12. Inverter 86 causes a second 180 degree phase change to the now compensated write current, and thus effectively returns the signal to its original phase, but in its modified timing form as modified encoding signal 17. A compensated write current 16M is subsequently produced by, for example, the action of amplifier 48 and inverter 50-amplifier 52.

Another preferred embodiment of D.C. compensation circuit 46 is set forth in FIG. 5. It includes a delay line 92 and a "D" type flip-flop 94, with delay line 92 being in series between data encoder 44 and flip-flop 94, but with data from encoder 44 also being shunted directly in series to flip-flop 94. In operation, this circuit is set for activation to delay the signal from encoding circuit 44 only when the direction of the resulting write current 16M to head 42 will cause the production of a magnetic record bit which will traverse or be polarized in the same direction as the polarity of D.C. premagnetized magnetic medium 12.

The output signal 16M to transducer 42 from the circuits of either FIGS. 4 and 5 is substantially as illustrated in FIG. 2. It is again noted that encoding signal 15 in both FIGS. 1 and 2 are substantially identical, with a modified encoding signal 17 being produced as a result of the present invention.

While the embodiments of the present invention have been discussed and illustrated as providing a return transition delay, the problem identified by the present invention can be solved with equal facility by the expedient of providing a form of compensation circuit 46 which writes the switching transition early, and thus in that way avoids the writing of a polarized signal which would otherwise cause peak shift in D.C. premagnetized medium 12.

Additional embodiments of the present invention will be apparent to those skilled in the art. It is therefore intended that the scope of the invention be limited only by the appended claims and the prior art and not by the preferred embodiments described herein. Accordingly, reference should be made to the following claims in determining the full scope of the present invention.

What is claimed is:

1. A system for writing digital data on magnetic recording medium which is D.C. premagnetized in a substantially single polarized direction, which system compensates to avoid peak shift during read-out due to the subsequent magnetic recording of data on said medium which magnetic data traverses said medium in substantially the said polarized direction as the polarized direction of D.C. premagnetization, said system including:

a magnetic write head transducer for selectively applying magnetic data to D.C. premagnetized magnetic recording medium in a polarized direction which traverses such medium in substantially the same direction and its D.C. premagnetized polarized direction and in at least one other direction;

means for providing digital data encoding signals for activating said magnetic transducer to selectively apply polarized magnetic data to D.C. premagnetized magnetic recording medium in subsantially the same direction as the direction of D.C. premagnetization and in at least one other direction; and means for adjusting the timing of the digital data encoding signal means when its activating signal is of the kind which would activate said magnetic transducer to apply magnetic data to D.C. premagnetized magnetic recording medium in substantially the same direction of polarization as the direction of the polarized D.C. premagnetization of said medium, wherein said timing adjusting means includes a resistor, a capacitor, and a first and second inverter, said resistor and said capacitor being in parallel with one another, said resistor and capacitor also both being in series with said signal encoding means, and wherein said first inverter is located in series between said signal encoding means and said resistor and capacitor and said second inverter is located in series after said resistor and capacitor; whereby peak shift due to the recording of data which traverses D.C. premagnetized magnetic medium in substantially the same polarized direction as the polarized direction of D.C. premagnetization of said medium is compensated to avoid shift in the read-out of data recorded on said D.C. premagnetized magnetic medium.

2. The system of claim 1 wherein said first inverter is an open collector having low impedance.

3. A system for writing digital data on magnetic recording medium which is D.C. premagnetized in a substantially single polarized direction, which system compensates to avoid peak shift during read-out due to the subsequent magnetic recording of data on said medium which magnetic data traverses said medium in substantially the same polarized direction as the polarized direction of D.C. premagnetization, said system including:

a magnetic write head transducer for selectively applying magnetic data to D.C. premagnetized magnetic recording medium in a polarized direction which traverses such medium in substantially the same direction and its D.C. premagnetized polarized direction and in at least one other direction;

means for providing digital data encoding signals for activating said magnetic transducer to selectively apply polarized magnetic data to D.C. premagnetized magnetic recording medium in substantially the same direction as the direction of D.C. premagnetization and in at least one other direction; and means for adjusting the timing of the digital data encoding signal means when its activating signal is of the kind which would activate said magnetic transducer to apply magnetic data to D.C. premagnetized magnetic recording medium in substantially the same direction of polarization as the direction of the polarized D.C. premagnetization of said medium, wherein said timing adjusting means includes a delay line and a "D" type flip-flop, said delay line being in series between said signal encoding means and said flip-flop, and with said flip-flop also being in shunted direct series contact with said signal encoding means, said flip-flop arranged for activation in response to a signal which would activate said magnetic transducer to apply magnetic data to D.C. premagnetized magnetic recording medium in substantially the same direction of polarization as the direction of polarized D.C. premagnetization of the medium; whereby peak shift due to the recording of data which traverses D.C. premagnetized magnetic medium in substantially the same polarized direction as the polarized direction of D.C. premagnetization of said medium is compensated to avoid shift in the read-out of data recorded on said D.C. premagnetized magnesium medium.

4. A system for writing digital data on magnetic recording medium which is D.C. premagnetized in a substantially single polarized direction, which system compensates to avoid peak shift during read-out due to the subsequent magnetic recording of data on said medium which magnetic data traverses said medium in substantially the same polarized direction as the polarized direction of D.C. premagnetization, said system including:

a magnetic write head transducer for selectively applying magnetic data to D.C. premagnetized magnetic recording medium in a polarized direction which traverses such medium in substantially the same direction and its D.C. premagnetized polarized direction and in at least one other direction;

means for providing digital data encoding signals for activating said magnetic transducer to selectively apply polarized magnetic data to D.C. premagnetized magnetic recording medium in substantially the same direction as the direction of D.C. premagnetization and in at least one other direction; and means for adjusting the timing of the digital data encoding signal means when its activating signal is of the kind which would activate said magnetic transducer to apply magnetic data to D.C. premagnetized magnetic recording medium in substantially the same direction of polarization as the direction of the polarized D.C. premagnetization of said medium, wherein said timing adjusting means includes a capacitor, said capacitor being in series with said signal encoding means, said capacitor located and selected for activation in response to a signal which would activate said magnetic transducer to apply magnetic data to D.C. premagnetized magnetic recording medium in substantially the same direction of polarization as the direction of the polarized D.C. premagnetization of the medium; whereby peak shift due to the recording of data which traverses D.C. premagnetized magnetic medium in substantially the same polarized direction as the polarized direction of D.C. premagnetization of said medium is compensated to avoid shift in the read-out of data recorded on said D.C. premagnetized magnetic medium.

* * * * *